United States Patent
Eimer et al.

[11] Patent Number: 6,139,609
[45] Date of Patent: Oct. 31, 2000

[54] CONTAINER OF A DRYING SYSTEM CONTAINING ADSORPTION MEDIUM

[75] Inventors: Klaus Eimer, Ratingen; Hans-Michael Schuster, Haan; Dirk Mittelstädt, Krefeld, all of Germany

[73] Assignee: Ultra-Filter International GmbH, Haan, Germany

[21] Appl. No.: 09/302,648

[22] Filed: Apr. 30, 1999

Related U.S. Application Data

[63] Continuation of application No. PCT/EP97/05966, Oct. 29, 1997.

[51] Int. Cl.[7] ................................................. B01D 53/04
[52] U.S. Cl. ......................... 96/117.5; 96/132; 96/133; 96/136; 96/137; 96/138; 96/149; 96/151
[58] Field of Search .............................. 96/108, 109, 111, 96/117, 117.5, 131–133, 135–138, 147, 149, 151, 153; 55/DIG. 5

[56] References Cited

U.S. PATENT DOCUMENTS

| | | | |
|---|---|---|---|
| 2,195,565 | 4/1940 | Fricke | 96/132 |
| 2,669,318 | 2/1954 | Briggs | 96/131 |
| 2,703,628 | 3/1955 | Pompeo et al. | 96/111 |
| 2,728,407 | 12/1955 | Squier | 96/137 |
| 2,930,445 | 3/1960 | Glass et al. | 96/131 |
| 2,951,551 | 9/1960 | West | 96/133 |
| 3,064,819 | 11/1962 | Jones | 96/132 X |
| 3,171,726 | 3/1965 | Roney et al. | 96/117.5 |
| 3,240,567 | 3/1966 | Caparreli et al. | 96/149 X |
| 3,505,783 | 4/1970 | Graham | 96/117.5 X |
| 3,705,480 | 12/1972 | Wireman | 96/117.5 |
| 3,841,484 | 10/1974 | Domnick | 96/117.5 X |
| 4,241,769 | 12/1980 | Wieser | 141/83 |
| 4,259,097 | 3/1981 | Patel et al. | 96/136 |
| 4,261,715 | 4/1981 | Frantz | 96/137 |
| 4,478,619 | 10/1984 | Arends et al. | 96/132 |
| 4,543,112 | 9/1985 | Ackley et al. | 96/137 |
| 4,552,570 | 11/1985 | Gravatt | 96/111 X |
| 4,572,725 | 2/1986 | Kojima | 96/137 |
| 4,673,420 | 6/1987 | Haker et al. | 55/179 |
| 4,741,697 | 5/1988 | Herbison | 96/117.5 X |
| 4,746,338 | 5/1988 | Williams | 96/132 X |
| 4,770,678 | 9/1988 | Haslett, Jr. | 96/117 |
| 4,828,589 | 5/1989 | Bauer et al. | 96/109 |
| 4,830,643 | 5/1989 | Sassa et al. | 55/316 |
| 4,859,220 | 8/1989 | Leber et al. | 96/131 |
| 4,997,465 | 3/1991 | Stanford | 96/133 X |
| 5,002,596 | 3/1991 | Moskaitis et al. | 96/153 X |
| 5,034,039 | 7/1991 | Goddard | 55/275 |
| 5,174,798 | 12/1992 | Luby | 96/131 X |
| 5,240,483 | 8/1993 | Rosen | 96/137 |
| 5,290,344 | 3/1994 | Onodera | 96/131 X |

FOREIGN PATENT DOCUMENTS

| | | |
|---|---|---|
| 0 065 019 A1 | 11/1982 | European Pat. Off. . |
| 1332418 | 6/1963 | France . |
| 38 20 708 A1 | 12/1989 | Germany . |

OTHER PUBLICATIONS

German Utility Model G 85 18 993.6, dated Dec. 11, 1986, air dryer for compressed air systems.
Ultrafilter GmbH: "Dry Compressed Air The Cleanest Solution—Guaranteed".

Primary Examiner—Robert H. Spitzer
Attorney, Agent, or Firm—Herbert L. Lerner; Laurence A. Greenberg; Werner H. Stemer

[57] ABSTRACT

An advantageous configuration of an adsorption medium in a drying plant is described. At least one cartridge containing the adsorption medium for a gas to be dried is removably disposed in a container of the drying plant. A pressure prevails between the adsorption medium and the cartridge such that the adsorption medium remains stationary in the cartridge, in particular even under changing operating and/or environmental conditions. Using the cartridge enables the adsorption medium to be changed rapidly and safely on site. In addition, the invention ensures a high quality of gas drying, in particular without the added risk of the particles being released. Different cartridges can also be used for different adsorption media and can therefore be optimized to suit the most varied of drying plants.

38 Claims, 8 Drawing Sheets

CONTAINER OF A DRYING SYSTEM CONTAINING ADSORPTION MEDIUM

CROSS-REFERENCE TO RELATED APPLICATION

This application is a continuation of copending International Application No. PCT/EP97/05966, filed Oct. 29, 1997, which designated the United States.

BACKGROUND OF THE INVENTION

Field of the Invention

The present invention relates to a container for a drying system, in which an adsorption medium is provided for a gas to be dried.

In producing gas pressure, the moisture content of the gas often assumes an important role for downstream gas consumers. Amongst other things, the quality of the gas therefore depends on being able to produce a desired residual moisture content reliably. In order to do this, a known approach in drying systems is to use an adsorption medium, which adsorbs the moisture contained in the gas. The dry proportions of gas pass through the adsorption medium, which might be provided in the form of a granulate, for example. This being the case, suitable adsorption media might be silica gel or silica gels, aluminium oxide, molecular screens, active carbons or others, the drying medium becomes saturated and is then re-generated during a regeneration cycle. After a certain number of adsorption and regeneration cycles, the drying medium becomes so degraded that it has to be changed. A drying system of this type is described along with other dryers in a brochure published by Ultrafilter GmbH, Büssingstraβe 1, D-42781 Haan, entitled "Trockene Druckluft. Mit Sicherheit ein reiner Gewinn" (Dry Pressurized Air, Surely An Advantage), brochure reference T997.004.03D 10.95.

In order to ensure that the gas contains a defined residual moisture, in particular a maximum residual moisture, one particularly important factor apart from restoring the adsorption capacity of the spent adsorption medium is the manipulation of the adsorption medium in the container of the drying system when a plant is being operated on a continuous basis. The operating personnel of the drying system must be in a position to be able to completely remove adsorption medium which has degraded too far from the container without having to subject the drying plant to prolonged down times.

SUMMARY OF THE INVENTION

It is accordingly an object of the invention to provide a container of a drying system containing an adsorption medium which overcome the above-mentioned disadvantages of the prior art methods and devices of this general type, which makes it simple but safer to operate and manipulate the adsorption medium used in a container of a drying system, in particular so that the quality of the gas to be dried is guaranteed to be constant for downstream consumers.

With the foregoing and other objects in view there is provided, in accordance with the invention, a container of a drying plant for drying gas, including: a container body; cartridges including a first cartridge and a second cartridge disposed in the container body so as to be easily removed from the container body; an adsorption medium for a gas to be dried disposed in at least one of the first cartridge and the second cartridge, a pressure prevailing between the adsorption medium and at least one of the first cartridge and the second cartridge is such that the adsorption medium is stationary even under changing operating and environmental conditions in the at least one of the first cartridge and the second cartridge; the second cartridge stacked on top of the first cartridge in the container body so that there is a guaranteed guided flow from the first cartridge to the second cartridge and a connection of the first cartridge to the second cartridge and to the container body being substantially gas-tight; at least a part of the first cartridge and the second cartridge can be re-used after the adsorption medium has been replaced and the first cartridge and the second cartridge being at least partially identical in structure; and the cartridges each having a top rim and a bottom rim, at least one of the top rim and the bottom rim functioning as a seal so that the gas to be dried is applied to an entire cross-section of the adsorption medium without being diverted between the first cartridge and the second cartridge.

The container for the drying plant in which the adsorption medium is provided for the gas to be dried has at least one cartridge, which can be removed from the container, the adsorption medium for the gas to be dried being disposed in the cartridge. The pressure prevailing between the adsorption medium and the cartridge is such that the adsorption medium is stationary inside the cartridge. This is particularly the case under varying operating and/or environmental conditions. To this end, the adsorption medium is preferably inserted in the cartridge and fixed therein in such a way that it will remain stationary even under the effect of higher gas flow rates.

If the container is filled directly with the adsorption medium, because it is placed in a rigid configuration in the drying plant, it can be very awkward to remove the adsorption medium from the container and re-fill it in such a way that all particles of the drying medium are laid stationary and do not move against one another causing wear as the gas or air flows through. Filling a cartridge and then fitting the cartridge in the container, means that the adsorption medium can be completely changed with very little manual contact on the one hand and, on the other, because it involves nothing more than a changeover of a single component, the cartridge, very little time will be required. Furthermore, using a cartridge with the adsorption medium placed in it obviates the need for lengthy checks to ascertain whether the adsorption medium has been completely removed from the container, this being difficult in corners, orifices and around seals or similar. Therefore, the cartridge can also be replaced by inexperienced personnel.

Another advantage of using the adsorption medium in the cartridge is the fact that pressure is activated between the two so that the adsorption medium is unable to move in the cartridge. Due to the fact that the moist gas to be dried flows through the adsorption medium, there can be no friction between particles of the adsorption medium that would otherwise occur, for example with an aggregate. Such friction causes surface wear, causing a fine particulate dust to be formed on the adsorption medium. The very fine particles can get into the gas circuit downstream of the drying system, which is undesirable. Here, the particles are then in a position to cause damage not only to the gas lines but also in the gas consumers. In instances where the adsorption medium has a service life of one or two years in the drying plant, sometimes even longer, for example in heat or cold generating plants, the friction leads to increasing surface wear and hence to a progressively creeping surface loosening of the adsorption medium itself. This is particularly exacerbated due to the fact that flows are fed through the adsorption medium alternately in opposite directions.

Even if the container is filled with the adsorption medium in such a way that it is completely full, changing operating and or environmental conditions such as pressure, temperature, gas elements, in the through-flow direction or similar, lead to a gradual loosening of elements in the adsorption medium. By applying a pressure between the adsorption medium and the cartridge, however, movement and abrasive wear is reduced, even if the cartridge is placed in the container of the drying system over a long service life. Another advantage of fixing the adsorption medium in the cartridge resides in the fact that the through-flow rate of the gas to be dried can be enhanced by the cartridge without causing the adsorption medium to become virtually fluid.

One embodiment of the invention is such that the cartridge is made predominantly from a plastic material. The plastic material is capable of expanding, whether it is in an axial or a radial direction. Similarly to a plastic material, a thin-walled metal material or similar would be suitable. A certain degree of flexing capacity in the cartridge when traction or pressure is exerted thereon enables a pressure state between the adsorption medium and the cartridge to be inherently applied to the unit containing the two, so to speak. The cartridge can be manufactured in one integral piece, having an opening for filling purposes for example, which will subsequently be closed off. All force-fit and form-fit connection techniques are suitable for closing the cartridge, for example plastics, bonding, welding, and fusion.

One particularly advantageous manner of ensuring sufficient pressure between the adsorption medium and the cartridge is produced as a result of the fact that the cartridge wall can be pre-tensioned. By being capable of being pre-tensioned within the meaning of the invention, it is meant that the wall possesses a certain elasticity, which can be used by the application of pressure or traction in such a way that when the tension or pressure causing external forces is released, a pressure remains permanently between the adsorption medium and the cartridge. This pre-tensioning is preferably produced using an appropriate configuration of the cartridge wall. For example, it will have a bead at least around part of the circumference. If the cartridge wall is built in sections having varying elasticity coefficients and/or heat expansion coefficients, the adsorption medium contained therein can also be guaranteed to remain stationary. This is particularly important when the cartridge is being transported since jolts, vibrations and temperature changes in the range of 10° C. and more could easily induce length variations within the tenth of a millimeter range. The cartridge is pre-tensioned relative to the adsorption medium in another embodiment of the invention due to the way the cartridge is disposed in the container in the drying system, for example by securing the cartridge to a cover belonging to the container, through which the gas to be dried is fed into the cartridge or by attaching it to another component belonging to the container.

In another embodiment of the invention, the pressure between the cartridge wall and the adsorption medium is produced by a pressure-exerting device disposed in the immediate vicinity of the adsorption medium. The elastic properties of the device, which might be a spring or an elastic material for example, will be such that it is capable of maintaining a certain minimum pressure, even over a longer period. When inserting the cartridge or mounting the cartridge in the container, it is of particular advantage if the pressure-exerting device can be pre-tensed. This will ensure that if the pre-tension is adequate, there will always be a sufficiently adequate range to the minimum tension needed to fix the adsorption medium in the cartridge as required.

The spring or elastic material may be disposed in the cartridge or in the container. In one very practical embodiment, the interior wall of the cartridge has at least a partial cladding made from an elastic material. When the adsorption medium is inserted in the cartridge, the pressure will then build up automatically. The cladding itself may be a foam or a gas chamber covered with a film, for example.

One particularly advantageous embodiment has an elastic hose in the interior of the cartridge, for example a fitted rubber hose. This can be inserted loosely and then so expanded as it is filled with adsorption medium that a permanent tension builds up in the hose. This makes it possible to work with hoses of very small thicknesses. The hose or other elastic material may also be attached to the wall, by bonding for example.

In order to make more practical use of the interior of the container in the drying system, it is advantageous to mount not just one but several cartridges therein. In this manner, it will be possible to make optimum use of cartridges of differing lengths and/or diameters for the different gases to be cleaned in different drying plants. In order to set up a path for the through-flowing gas, the cartridges can be stacked one on top of the other, for example. This is done in such a way that the flow will be guided from a first cartridge into a second cartridge placed thereon. The structural configuration will be such that the through-flowing gas is guided in the interior of the cartridge onto the adsorption medium across the entire surface thereof. In order to standardize cartridges for manufacturing purposes as well as for users, it is of advantage if the stacking cartridges are at least partially of the identical construction. This will simplify the connection of the first cartridge to the second for flow purposes. Using a male-female system to connect the first and second cartridges will also ensure that the first and second cartridges can not be incorrectly assembled with one another even by inexperienced users or when fitting in configurations which can not be overseen or are not visible. Undesired bypass flows of not yet fully dried gas will therefore not be able to occur at the connection point between the first and second cartridges. The solid configuration of the cartridge cover as a cambered base is a preferred embodiment for a cartridge, where one base is inwardly cambered and the other base is outwardly cambered.

If the cartridges are stacked in the container one above the other, the cartridges can contain different types of adsorption materials and/or filters having different properties. If a water-resistant or moisture-resistant adsorption medium is used in the first cartridge of the cartridges stacked one above the other in the direction in which the gas to be dried is flowing, it will be possible by using an appropriate layout of the drying system to use a medium in the subsequent cartridge on which, for example, water has an unfavorable effect but which nevertheless results in that the residual moisture left behind can no longer cause any damage. Consequently, it is also possible to use media that will apply an adsorption or filtering effect to specific elements of the gas.

In another embodiment of the invention, the container is constructed in such a way that it has an opening for letting the gas out of the container that seals off an inserted cartridge under gas pressure by one section, in particular an elastic section. This enhances the operating safety of the drying plant. Pressure is prevented from building up in the container, although no adsorption medium is contained therein. If an attempt is made to operate the drying plant with a cartridge inserted but without the cartridge containing any adsorption medium, another embodiment removes the sealing effect between the cartridge and the container provided the adsorption medium has been removed from the cartridge.

Generally speaking, the adsorption medium is switched from adsorption to regeneration operation and vice versa at fixed time intervals, regardless of the actual charge of moisture. An operating mode of the plant adapted to current operating conditions is provided by devices for transmitting and/or indicating the status of the adsorption medium, contained in the cartridge and/or the container. Advantageously, the status of the adsorption medium is ascertained by a capacitive measurement. Other measuring options, for example a measurement of the level of moisture, chemical action or similar, may also be used in conjunction with the cartridge or the container. The data picked up in this manner can then be transmitted to an appropriate control unit.

One option of transmitting signals relating to the status of the adsorption medium from the cartridge across the container to an appropriate control point of the drying plant consists in connecting the cartridge in an appropriate manner to the container. Furthermore, in order to ensure that the gas is fed into the cartridge correctly, it is of advantage if the cartridge is connected to a cover of the container. This connection can be easily set up and sealed. In addition, this allows one or more cartridges connected to one another to be disposed in the container suspended from the cover. A flow path will be pre-determined from the cover through the cartridges so that, because of the suspended configuration in the container, at least partially open towards the bottom, the pressure of the gas will also exert a certain effect there too.

In order to connect the cartridge to a part of the container and/or another cartridge, particularly at high pressures, it has a thread or bayonet fitting. When fitted correctly, this closure ensures that correct sealing is provided between the connected parts. In order to prevent bypass flows, which are not desirable inside the container, the cartridge in another embodiment is provided with a top and/or bottom rim, configured as a seal. This may be an elastomer collar that will adapt to different geometries on which the cartridge might be placed or mounted, but may also be a sealing lip or similar sealing devices known from the prior art.

Other features which are considered as characteristic for the invention are set forth in the appended claims.

Although the invention is illustrated and described herein as embodied in a container of a drying system containing an adsorption medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
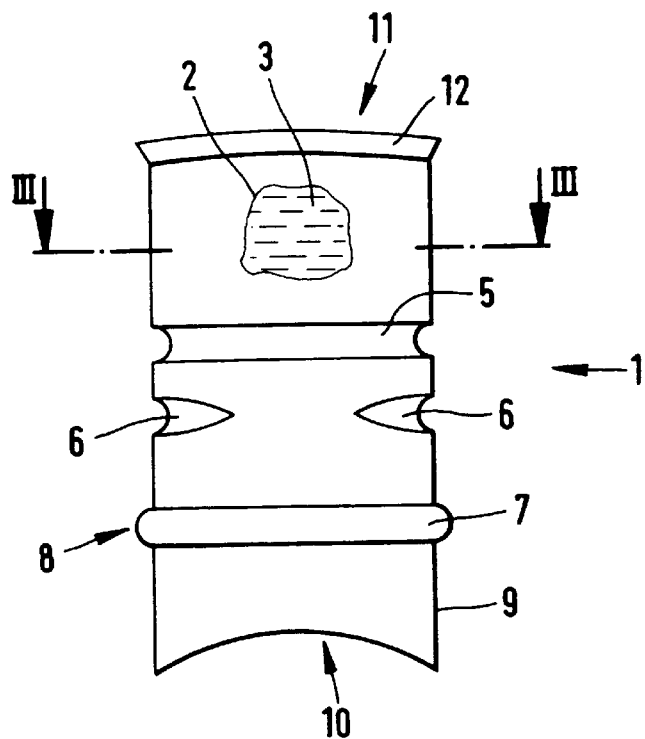
FIG. 1 is a diagrammatic, partially cut-away, front-elevational view of a cartridge according to the invention.

In all the figures of the drawing, sub-features and integral parts that correspond to one another bear the same reference symbol in each case. Referring now to the figures of the drawings in detail and first, particularly, to FIGS. 1–3 thereof, there is shown an embodiment of a cartridge 1 as proposed by the invention. The internally hollow cartridge 1 contains an adsorption medium 3 illustrated in a cut-out section 2. A cartridge wall 4 has a circumferential groove 5, reinforcing creases 6 around part of the circumference and a circumferential collar 7. These ensure individually and, particularly as illustrated here in conjunction with one another, that the adsorption medium 3 is compressed by appropriate pre-tensioning of the cartridge 1 so that it can not move inside the cartridge 1. For example, in order to apply pressure, the collar 7 may be made from a different material or may be given a different elasticity coefficient as part of the manufacturing process of the cartridge 1. In this manner, it is possible to define one or more wall sections 8 of the cartridge 1 to have a specific capacity for deformation. Collars 7 or similar devices may lie toward the interior or toward the exterior of the cartridge 1, depending on what compensating motion is required.

The cartridge 1 in the configuration illustrated in FIG. 1 has several other advantages. The cartridge 1 is of a longitudinal cylindrical shape 9 with a first 10 and a second 11 end face. Both end faces 10, 11 are cambered, the respective camber being in one direction in the embodiment. This being the case, the cartridge 1 has a male-female system so that the cartridges 1 of identical construction can be correctly stacked. This rules out any confusion as to the flow direction through the cartridge 1. In addition, because of the cambered construction, the end faces 10, 11 are advantageously able to transmit the pressure acting on them to the cylindrically shaped base body 9. The cartridge 1 is therefore capable of allowing even high pressures between the adsorption medium 3 and the cartridge 1. In order to avoid gas losses if the cartridges 1 are stacked one on top of the other, the second end face 11 has a seal 12. The seal 12 is configured such that a second cartridge 1 can be placed on a first cartridge 1 as illustrated by a virtual clip-on action between the oppositely lying end faces 10, 11, sealing off the gas flow between the two cartridges 1.

Figure 2:
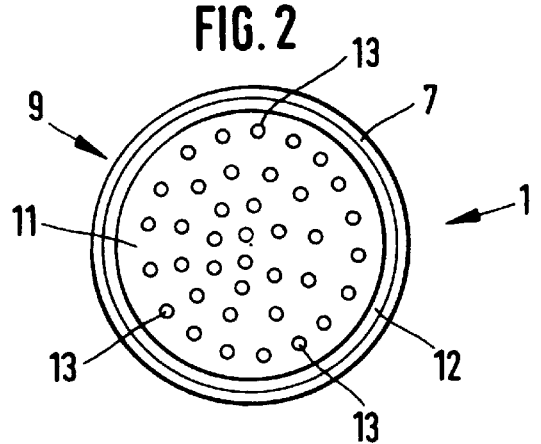
FIG. 2 is a plan view of the cartridge illustrated in FIG. 1.

FIG. 2 illustrates the cartridge 1 of FIG. 1 in a plan view. In addition to the seal 12 and the collar 7, a plurality of orifices 13 are visible. The orifices 13 are so disposed on the second end face 11 that the flow will be applied to the surface of the entire cross-section of the adsorption medium inside the now clearly cylindrically shaped base body 9. The dimensions of the orifices 13 are such that the pressure loss on flowing through is only slight on the one hand and on the other if an aggregate is used as the adsorption medium 3 it can not fall out through the orifices 13. The interior of the cartridge 1 advantageously requires no retaining filter when completely filled with adsorption medium 3, therefore the pressure is exerted from all interior walls of the cartridge 1.

Figure 3:
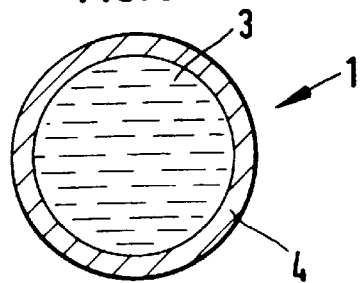
FIG. 3 is a sectional view taken along the line III—III of FIG. 1.

FIG. 3 illustrates a section through the cartridge 1 illustrated in FIG. 1. The adsorption medium 3 is so densely packed in the cartridge 1 that it will not be able to move from its fixed position even when subjected to varying external influences such as pressure surges, temperature changes or vibrations. In one advantageous embodiment of the cartridge 1, the material of the cartridge wall 4 is the same as the material of the adsorption medium 3 or is made from ceramic, preferably ceramine. Subjected to a change in temperature, the adsorption medium 3 and the cartridge 1 will then exhibit approximately the same expansion behavior.

In another embodiment, not illustrated here, the adsorption medium 3 is an inter-bonded or grouted granulate. This ensures that it will lie absolutely fixed in the cartridge 1.

Figure 4:
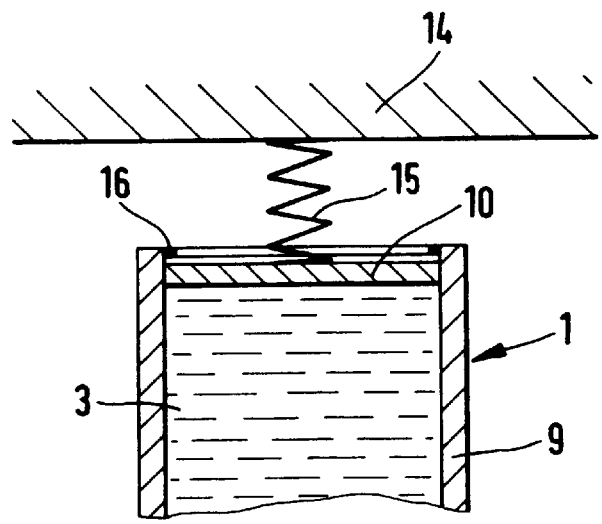
FIG. 4 is a fragmentary, sectional view illustrating a principle of the cartridge in a container of a drying plant.

FIG. 4 illustrates a second embodiment of the cartridge 1 as proposed by the invention, which is disposed in a container 14, only partially illustrated. The cartridge 1 has the first end face 10, which is disposed in the cylindrically shaped base body 9 so that it can move. When the cartridge 1 is inserted in the container 14, a spring 15 acting as a pressure-exerting means 15 is biased. This causes the end face 10 to apply permanent pressure to the adsorption medium 3. The spring 15 is preferably configured and mounted on the container 14 so that a basic attachment, not illustrated in more detail, is formed by the cartridge 1 on the container with a relatively small amount of force. The ultimate attachment on the container 14 in effect enabling the spring 15 to exert a pressure that will prevent the adsorption material 3 from becoming fluid even at high flow rates of gas through the cartridge 1. To ensure that the adsorption medium 3 cannot escape from the cartridge 1 during transport, the cartridge 1 has a projection 16, restricting the path of the first end face 10.

Figure 5:
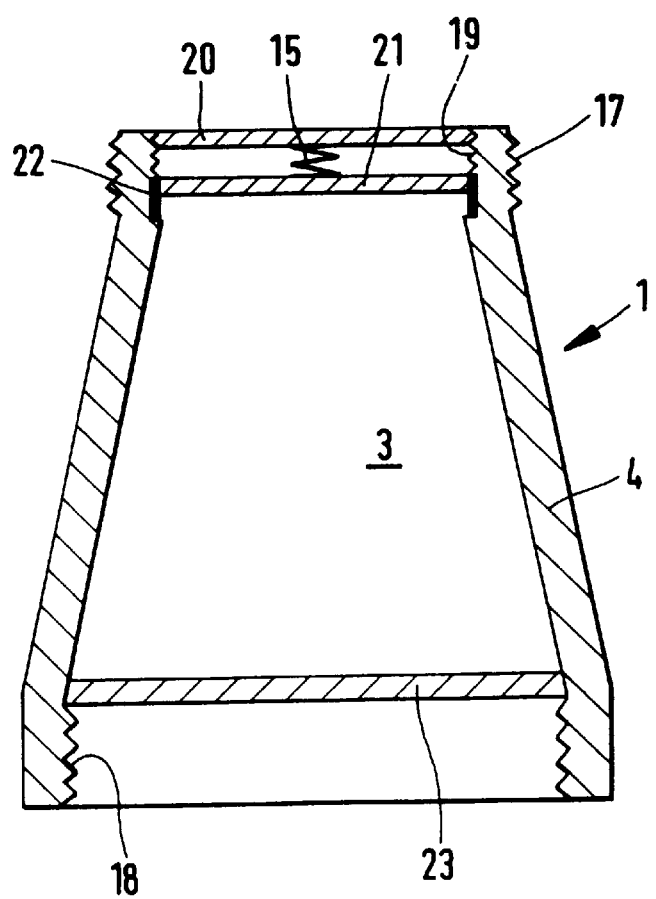
FIGS. 5–7 are sectional views illustrating different embodiments of the cartridge.

FIG. 5 illustrates a third embodiment of the cartridge 1 proposed by the invention. The third embodiment has an external thread 17, a first internal thread 18 and a second internal thread 19. The cartridge 1 is screwed onto the external thread 17 by the first internal thread 18 provided here. This provides a particularly robust connection between two cartridges and the sealing effect of the screw-fit can be reinforced by appropriate seals under certain circumstances.

A first end plate 20 is screwed onto the second internal thread 19, which acts as a thrust bearing for the pressure-exerting means 15, illustrated here as the spring 15. A second end plate 21 in turn applies pressure to the adsorption medium 3. In doing so, it slides at the rim on slide faces 22 which on the one hand keeps the friction resistance low and on the other produce an adequate sealing effect in conjunction with the second end plate 21.

The system containing the first end plate 20, the pressure-exerting means 15, the second end plate 21 and an oppositely lying third end plate 23 allows the pressure acting on the adsorption medium 3 to be varied by adjusting the first end plate 20. In particular, this allows a cartridge 1 to be used for various adsorption media 3. The first intermediate wall 20 can be adjusted depending on the pressure required between the adsorption medium 3 and the cartridge wall 4. The principle illustrated here as well as the idea of adjusting the pressure forces of the pressure-exerting means 15 can also be applied with other embodiments proposed by the invention. The cartridge 1 illustrated also has a conical shape, therefore, the cartridge 1 can also be used as the end cartridge in a stack. This facilitates connection to the container, not illustrated in more detail, due to the conical guiding action.

Figure 6:
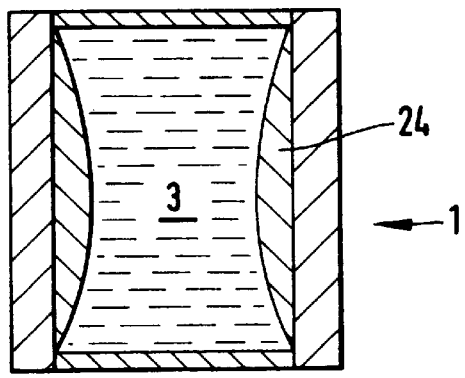

FIG. 6 illustrates a fourth embodiment of the cartridge 1 in cross-section. The adsorption medium 3 is disposed in the interior of the cartridge 1 under pressure. The pressure is caused by an elastic material 24, cladding at least a part of the interior of the cartridge 1. When the cartridge 1 is filled, the elastic material 24, which may be rubber for example, is compressed, the adsorption medium 3 inserted and the cartridge 1 sealed under pressure so that when the cartridge 1 is then taken out of the pressurized environment a ratio of forces needed as a way of fixing the adsorption medium 3 remains. In one advantageous embodiment, the elastic material 24 has filling compartments that are filled with gas. When high pressure is applied, these cavities are squashed together making a larger interior available for filling in the cartridge 1. Another variant of this type of embodiment has an elastic film, which forms a sealed gas bubble in the interior of the cartridge 1.

Figure 7:
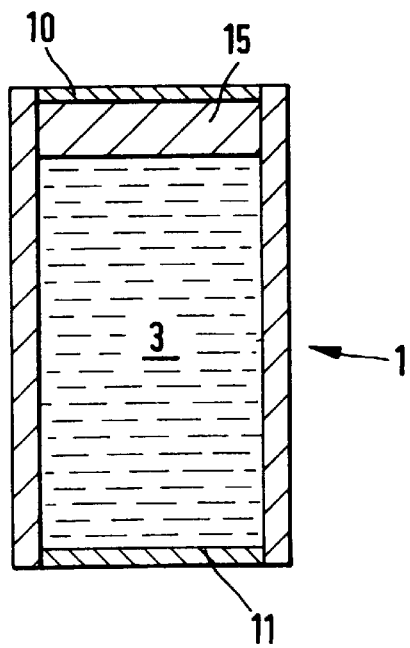

FIG. 7 illustrates another optional configuration for the pressure-exerting means 15 in the cartridge 1. In this case, a foam structure 15 is provided, which, because of its elasticity, is capable of applying the requisite pressure to the adsorption medium 3, even over a longer service life. In order to ensure the flow of gas through the cartridge 1, the foam structure 15 has continuous flow passages at the first end face 10 and the second end face 11 which are so fine, depending on the manufacturing method and material used for the foam 15, that an aggregate used as the adsorption medium 3 will not be able to fall through them or clog them.

Figure 8:
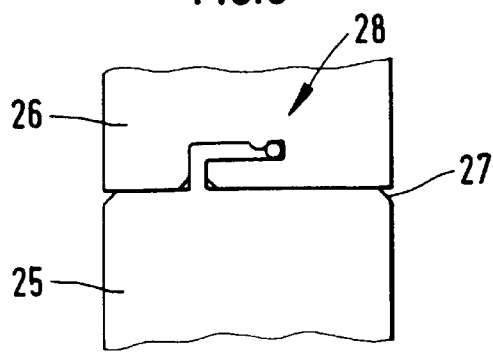
FIG. 8 is a fragmentary, front elevational view of a connection between two cartridges.

FIG. 8 illustrates a solution that ensures that the cartridges 1 stacked one on top of the other to have a flow-tight connection to one another. A second cartridge 26 is placed on a first cartridge 25. The positioning of the two cartridges is made easier by an inclined guide 27 on the first cartridge 25. A bayonet fitting 28 is closed by turning while simultaneously applying pressure. This offers an advantage in that the first 25 and the second 26 cartridge can be connected to one another by exerting mutual pressure. Extra support can be provided by inserting an appropriate seal, not illustrated in more detail, between the two cartridges 25, 26 or even by crimping the latter. In addition to the bayonet fitting 28, other similar solutions may be used as a way of connecting several cartridges, whereby a turning of the first cartridge 25 relative to the second cartridge 26 will produce a pressure-fit.

Figure 9:
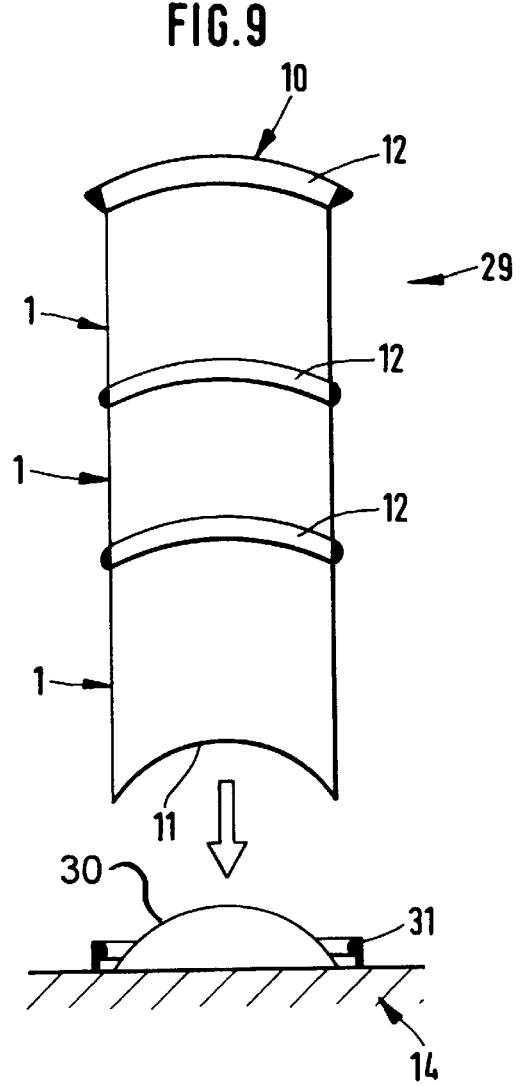
FIG. 9 is a front elevational view of several cartridges stacked in the container.

FIG. 9 depicts a stack 29 of three of the cartridges 1, each of which has the seal 12. The stack 29 is inserted in the direction of the arrow indicated in the section of the container 14. The free first end face 10 and second end face 11 each form the respective gas inlet and gas outlet, depending on the flow direction of the gas. No gas can flow out between the cartridges 1. With the configuration of the stack 29 in the container 14 illustrated here, the second end face 11 is placed on a coupling 30 with a matching form-fit configuration. The coupling 30 has gas orifices, not illustrated in more detail, through which the gas can get into the stack 29 above. A gas-tight seal between the coupling 30 and the second end face 11 is provided by a circumferential seal 31 mounted on the container 14. The sealing effect is assisted by force of gravity due to the fact that the stack 29 is supported on the base of the container 14 if no bearing structure is provided for the first end face 10 on the container 14, to which the stack 29 is also connected. It is particularly practical if the stack 29 is at least partially open towards the top so that the pressure of the gas is in the container 14 and only the container wall 4 will be required to have a configuration suitable as a pressure container.

Figure 10:
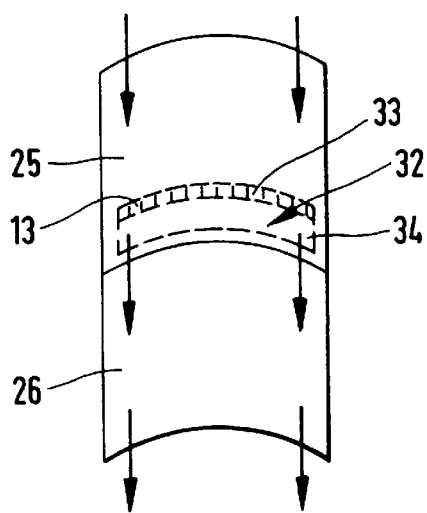
FIG. 10 is a front elevational view illustrating the principle of how a flow is guided inside the cartridges illustrated in FIG. 9.

FIG. 10 illustrates a main flow guide between the first cartridge 25 and the second cartridge 26. The gas, indicated by the arrows, is fed as far as possible without any diversions between the two cartridges 25, 26 but is uniformly applied to each cross-section of the adsorption medium 3 contained in the cartridges 25, 26. In order to promote as favorable a flow as possible in the cartridges 25, 26, the cartridge 25 has, depending on how it is constructed, an appropriate gas distributor device 32, as indicated by broken lines inside the cartridge 25. The gas distributor device 32 may consist of a cavity 34 and an internally mounted plate 33 with orifices 13 disposed in a shower-head pattern. The gas distributor device 32 of this construction ensures that the gas to be dried flows not only at the center but also at the periphery of the cartridge 25.

Figure 11:
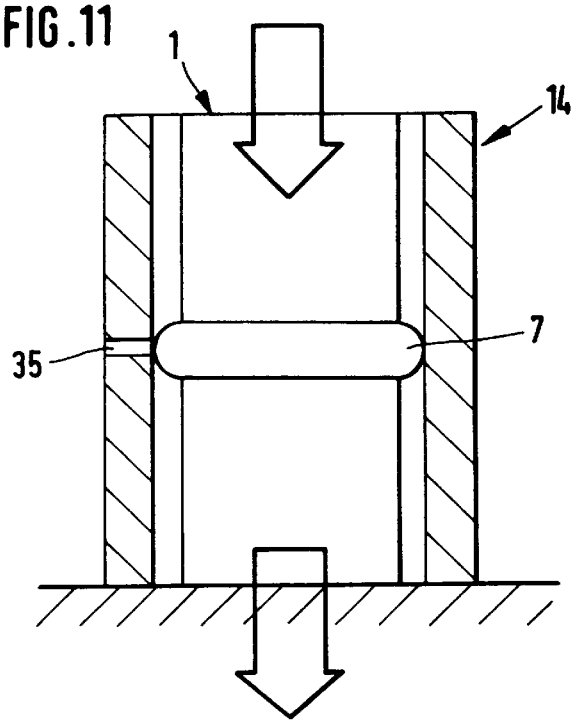
FIG. 11 is a sectional view of an orifice provided as a safety vent in the container, closed by the cartridge.

FIG. 11 depicts a safety vent 35 in the container 14, the cartridge 1 disposed in the container 14 having the elastic circumferential collar 7. When pressure is applied to the cartridge 1 by the gas to be dried, as indicated by the arrows, the collar 7 is pushed to the exterior of the cartridge 1. This closes off the safety vent 35. The purpose of this is to prevent operation of the drying plant if a cartridge 1 is not inserted, since the gas would otherwise flow out from the container 14. The collar 7 advantageously runs around the circumference so that on the one hand there is no need for accurate positioning of the cartridge 1 at a particular section of the container 14. If the collar 7 is disposed at the center of the cartridge 1 exactly matching the positioning of the safety vent 35 in the container 14, it will also be possible to rotate the cartridge 1 by 180° without use of the safety device being lost. Naturally, another section of the cartridge 1 may also be used for sealing purposes. In another embodiment, the cartridge 1 is screwed onto the container 14 so that one or more matching safety vents can be sealed off by the screw fitting. In another embodiment, the cartridge 1 has at least one bellows-type section, which preferably has a different elastic capacity from the sections of the cartridge 1 which are not of a bellows configuration. At least one of the bellows can be used to produce the same effect as that obtained by the circumferential collar 7.

Figure 12:
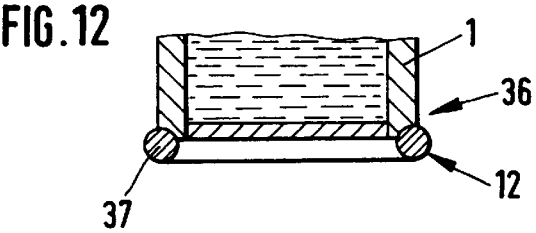
FIGS. 12–14 are sectional views of various seal configurations for the cartridge.
Figure 13:
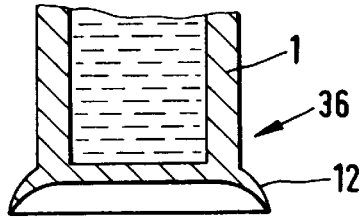
Figure 14:
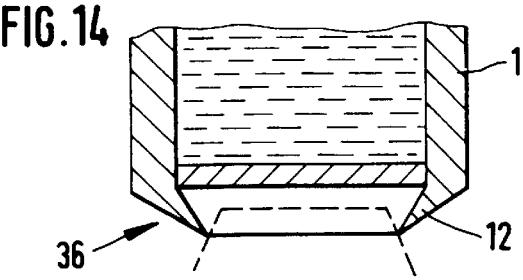

FIGS. 12–14 illustrate different embodiments of the seals 12 located on the top and/or bottom rim 36 of the cartridge 1. In FIG. 12, the bottom rim 36 illustrated has an elastomer seal 37, which, because of its bead-type configuration is compressed when the cartridge 1 is placed on another cartridge or on a base, thereby producing a gas-sealing action. The seals 12 illustrated on the bottom rim 36 of the cartridge 1 in FIGS. 13 and 14 are an integral part of the cartridge 1 and made from the same material. Depending on the manufacturing method used, the seals 12, in spite of being made from the same material as the rest of the walls of the cartridge 1, may be given different elastic properties. In the case of plastics, this could be controlled by applying appropriate temperatures or using additives, for example. While the seal 12 depicted in FIG. 13 is particularly preferred for seating the cartridges 1, the seal 12 illustrated in FIG. 14 in the form of a sealing lip is specifically used for connecting cartridges, illustrated by a broken line.

Figure 15:
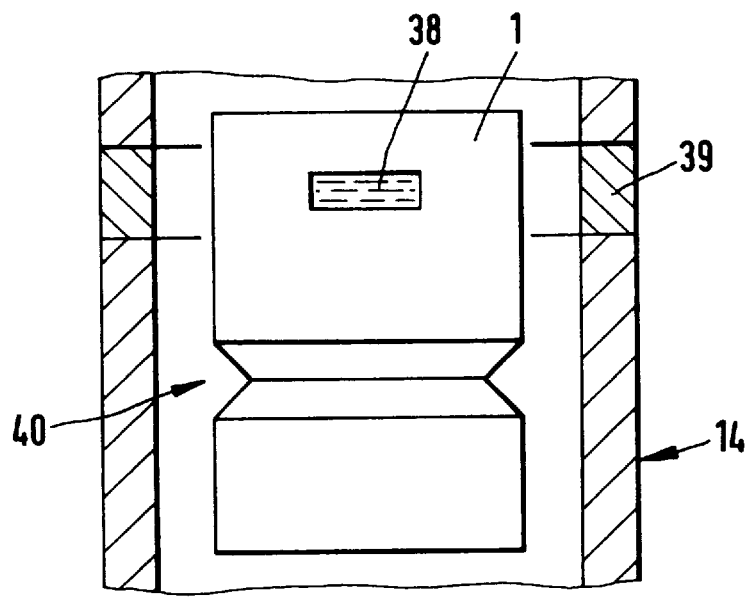
FIG. 15 is a sectional view of the cartridge that can be at least partially re-used and having an adsorption medium display for the adsorption medium disposed inside the cartridge.

FIG. 15 illustrates that the cartridge 1 is at least partially recyclable and has a display 38 for displaying a status of the adsorption medium 3. The display 38 can be disposed in the container 14 by inserting the cartridge 1 in such a way that the display 38 can be observed through a circumferential viewing window 39 from the exterior of the container 14. The operator of the drying plant will therefore be able to see the status of the adsorption medium 3 in the cartridge 1 without the need for any complex devices. In one advantageous embodiment in which the cartridges 1 are stacked one on top of the other, a display of this type will be needed for one cartridge 1 only. From the status of the cartridge 1, it will be possible to ascertain the overall status of the stack. In this manner, it will be possible to decide when the stack of cartridges 1, not illustrated here, needs to be regenerated. The display option is provided by a change in color on the display 38 caused by a chemical reaction due to the moisture adsorption. The illustrated cartridge 1 is constructed in such a way that it has a predetermined seam 40. The seam 40 is a predetermined fracture at which the cartridge 1 can be opened, i.e. partially broken. Consequently, the part of the cartridge 1 with the display 38 can be re-used while the other part can be replaced under certain circumstances. As a result, the adsorption medium 3 in the cartridge 1 can be replaced if it can no longer be regenerated. It is of particular advantage if the adsorption medium 3 can not be removed from the cartridge 1 unless the latter is broken. This will ensure that there can be no mishandling of already spent or no longer full cartridges 1. In a variant of the recycling principle, the cartridge 1 has a removable part, which can be replaced without the cartridge 1 having to be broken. This can be done by a screw thread, for example.

Figure 16:
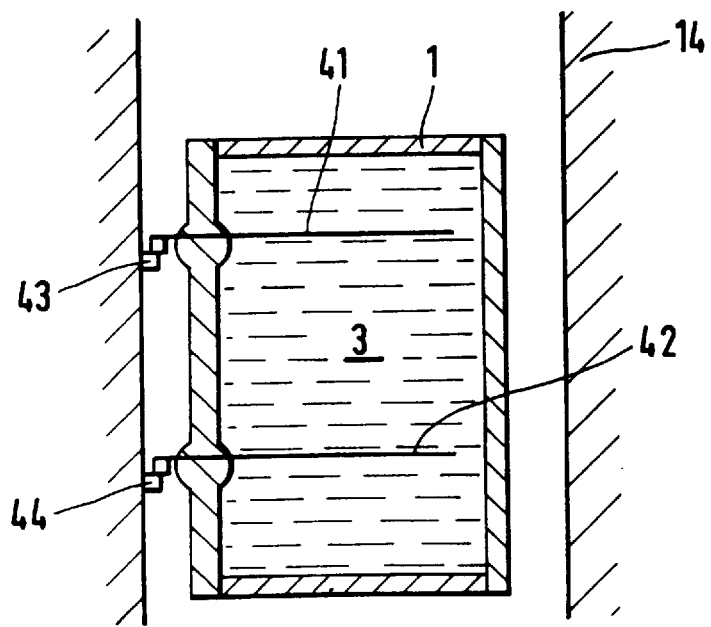
FIG. 16 is sectional view of another embodiment of the invention for transmitting information pertaining to the status of the adsorption medium.

FIG. 16 depicts the cartridge 1 in the container 14 fitted with a first 41 and a second 42 electric conductor. The electric conductors 41, 42 are used to take a capacitive measurement of the status of the adsorption medium 3. The respective status of the adsorption medium 3 in the cartridge 1 can then be ascertained by comparing the relative curves. This is preferably done automatically, the electric conductors 41, 42 being connected via a first 43 and a second 44 contact on the interior wall of the container to a control unit, not illustrated in more detail. Another possibility for measuring the status of the adsorption medium 3 consists in checking the actual flow of gas for moisture content. An appropriate device can be disposed in the container 14 for this purpose, for example a flow passage.

Figure 17:
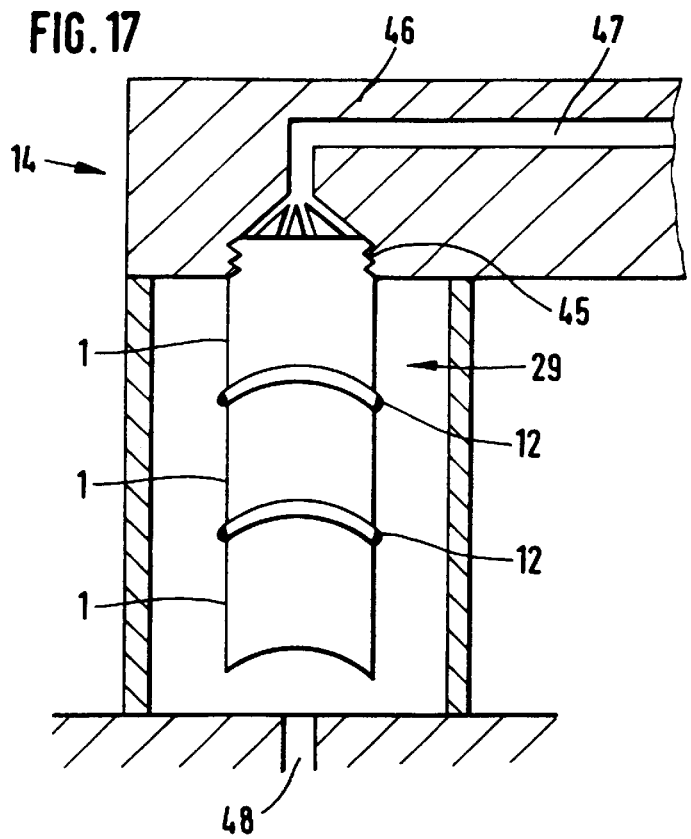
FIG. 17 is a sectional view of a configuration of cartridges suspended from a cover of the container of the drying plant.

FIG. 17 illustrates the stack 29 that is connected to a cover 46 of the container 14 by a thread 45. A gas line 47 is disposed in the cover 46, fitted with an inlet and outlet for the gas from the container 14. The stack 29 is suspended in the interior of the container 14. Therefore, the stack 29 can be removed from the container 14 simultaneously with the cover 46. Therefore, no problems can occur due to seals becoming too tight under certain circumstances, which necessarily arise with a fixture to the base of the container 14. The container 14 and the stack 29 are sealed in such a way that the gas can only flow into and out of the container 14 through the gas line 47 and a base line 48. Bypass flows from the stack 29 are prevented by the seals 12 between the cartridges 1. In another embodiment, not illustrated in more detail, the cover 46, provided with a matching guide and the seal, is placed on top of the stack 29. The seal is positioned in such a manner that it provides a seal as it is compressed by the guide and the stack 29. The forces occurring as a result can be so high that a structure of this type is able to retain the stack 29 still freely depending from the cover 46. Otherwise, the stack 29 can be seated on a matching projection on the container base in such a way that pressure will be transmitted from the gas into the container 14. A preferred embodiment of a cartridge also provides a good attachment to the cover 46 of the container 14. A cartridge of this type has a seal on the external rim at the top and/or bottom and a thread and a threaded pin at the center of the end face, for example. Accordingly, two cartridges can also be connected to one another by turning them relative to one another.

Figure 18:
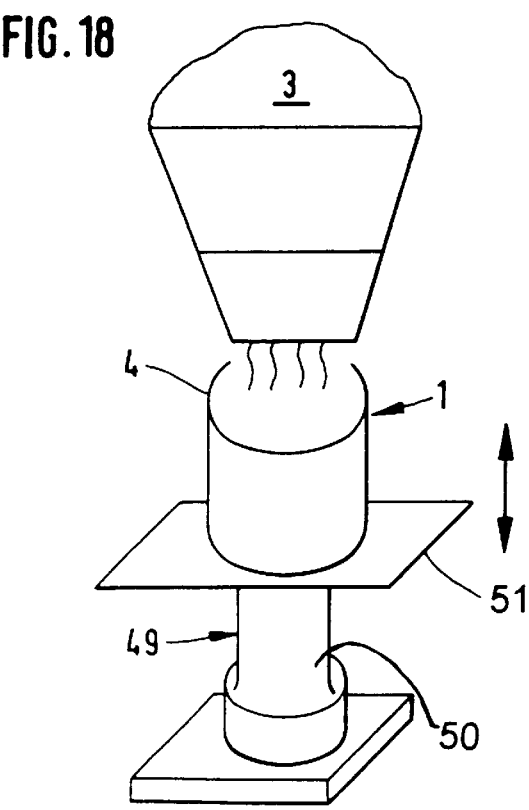
FIG. 18 is a fragmentary, perspective view illustrating how the cartridges are filled with an aggregate as the adsorption medium.

FIG. 18 illustrates a method of filling the cartridge 1, whereby the cartridge is braced on a device 49. The device 49 has a cylinder system 50, by which it can be vibrated on a clamping table 51 attached thereto, indicated by the arrow. The adsorption medium 3 is then poured into the cartridge 1 and is distributed extremely evenly inside the cartridge 1 due to the vibratory action. As the cartridge wall 4 is simultaneously pre-tensioned, for example by non-illustrated tensioners, once the cartridge 1 is closed, a permanent pressure is produced between the adsorption medium 3 contained in the cartridge 1 and the cartridge wall 4.

Figure 19:
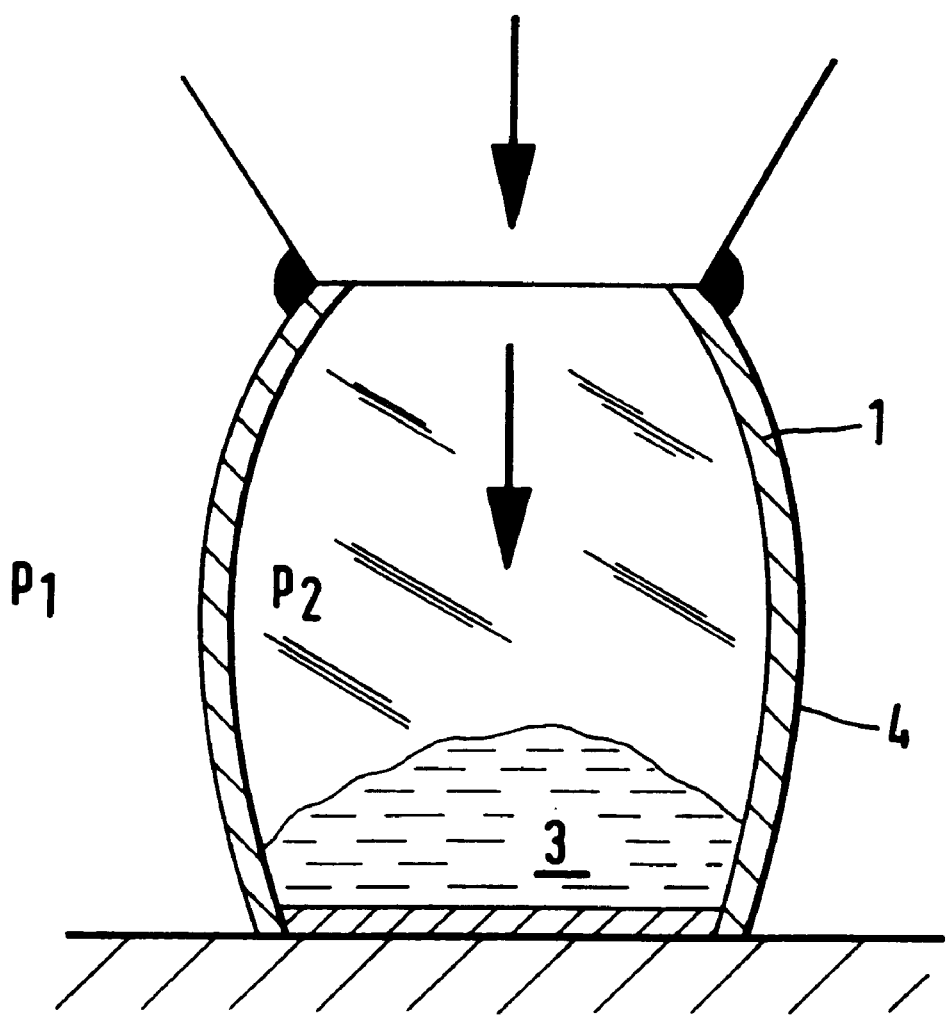
FIG. 19 is a sectional view of the principle whereby the cartridge is filled with the aggregate as the adsorption medium.

FIG. 19 illustrates a second method of filling the cartridge 1. The adsorption medium 3 is poured in under the action of pressure p2 prevailing in the interior of the cartridge 1 while a pressure p1 prevails at the external wall of the cartridge 1. Since the pressure p2 is greater than the pressure p1, the cartridge wall 4 widens. Consequently, it is possible to pour in more adsorption medium 3 than would be the case if a pressure p1 were acting in the interior of the cartridge 1. Once completely filled, the cartridge 1 is closed so that a permanent tension prevails in the cartridge walls 4. This ensures that the adsorption medium 3 is not able to work loose or to move. This filling method illustrates one possible way in which the cartridge wall 4 can be pre-tensed, tending to cause a reduction in volume in the cartridge 1 when released.

The present invention provides an advantageous configuration of the adsorption medium 3 in the container 1 of a drying plant. Using the cartridge 1 enables the adsorption medium 3 to be changed rapidly and safely on site. In addition, the invention ensures a high quality of gas drying, in particular without the added risk of the particles coming loose. Different cartridges 1 can also be used with different adsorption media 3 and can therefore be optimized to suit the most varied of drying plants.

We claim:

1. A container of a drying plant for drying gas, comprising:

a container body;

cartridges including a first cartridge with a first hollow interior and a second cartridge with a second hollow interior, said second cartridge disposed in said container body so as to be easily removed from said container body;

an adsorption medium for a gas to be dried disposed in at least one of said first cartridge and said second cartridge, at least part of said adsorption medium completely filling said first hollow interior and said second hollow interior, a pressure prevailing between said adsorption medium and at least one of said first cartridge and said second cartridge is such that said adsorption medium is stationary even under changing operating and environmental conditions in said at least one of said first cartridge and said second cartridge;

said second cartridge stacked on top of said first cartridge in said container body so that there is a guaranteed guided flow from said first cartridge to said second cartridge and a connection of said first cartridge to said second cartridge and to said container body being substantially gas-tight;

at least a part of said first cartridge and said second cartridge can be re-used after said adsorption medium has been replaced and said first cartridge and said second cartridge being at least partially identical in structure; and said cartridges each having a top rim and a bottom rim, at least one of said top rim and said bottom rim functioning as a seal so that the gas to be dried is applied to an entire cross-section of said adsorption medium without being diverted between said first cartridge and said second cartridge.

2. The container according to claim 1, wherein said cartridges are predominantly made of a plastic material.

3. The container according to claim 1, wherein said cartridges are at least partially made from a same material as said adsorption medium.

4. The container according to claim 1, wherein said cartridges and said adsorption medium are at least partially made from a ceramic.

5. The container according to claim 1, wherein said cartridges each have a cartridge wall that can be pretensioned, said cartridge wall having at least one of a partially circumferential crease formed therein and different wall sections with at least one of different coefficients of elasticity and different heat expansion coefficients.

6. The container according to claim 1, including a pressure-exerting device disposed adjacent said adsorption medium.

7. The container according to claim 6, wherein said pressure-exerting device is pre-tensed.

8. The container according to claim 6, wherein said pressure-exerting device is selected from the group consisting of a spring and an elastic material.

9. The container according to claim 8, wherein said cartridges each have an interior that is at least partially clad with said elastic material.

10. The container according to claim 8, including an elastic hose, and said cartridges each have an interior that is at least partially fitted with said elastic hose.

11. The container according to claim 1, wherein said container body has a vent for letting the gas out from the container body, and said cartridges each have a section sealing off said vent.

12. The container according to claim 11, wherein said section of said cartridges is an elastic section.

13. The container according to claim 1, wherein at least one of said cartridges and said container body has a display for at least one of transmitting and displaying a status of said adsorption medium.

14. The container according claim 13, wherein at least one of said cartridges and said container body has a capacitance measurer for taking a capacitive measurement of said adsorption medium.

15. The container according to claim 1, wherein said second cartridge stacked above said first cartridge has a different adsorption medium than said adsorption medium of said first cartridge.

16. The container according to claim 15, wherein in a direction in which the gas to be dried flows through said cartridges, said adsorption medium in said first cartridge contains a water-resistant adsorption medium.

17. The container according to claim 1, including a cover connected to a corresponding cartridge such that a gas delivery into said corresponding cartridge is ensured and said corresponding cartridge is suspended in said container body.

18. The container according to claim 1, including a seal disposed along only one line of at least two of said cartridges for sealing off said cartridges from said container body.

19. The container according to claim 18, wherein said seal is in a vicinity of an opening of at least one of a gas line and a base line to be connected to said container body.

20. A container of a drying plant for drying gas, comprising:
a container body;
cartridges including a first cartridge and a second cartridge disposed in said container body so as to be easily removed from said container body;
an adsorption medium for a gas to be dried disposed in at least one of said first cartridge and said second cartridge, a pressure prevailing between said adsorption medium and at least one of said first cartridge and said second cartridge is such that said adsorption medium is stationary even under changing operating and environmental conditions in said at least one of said first cartridge and said second cartridge;
said second cartridge stacked on top of said first cartridge in said container body so that there is a guaranteed guided flow from said first cartridge to said second cartridge and a connection of said first cartridge to said second cartridge and to said container body being substantially gas-tight;
at least a part of said first cartridge and said second cartridge can be re-used after said adsorption medium has been replaced and said first cartridge and said second cartridge being at least partially identical in structure;
said cartridges each having a top rim and a bottom rim, at least one of said top rim and said bottom rim functioning as a seal so that the gas to be dried is applied to an entire cross-section of said adsorption medium without being diverted between said first cartridge and said second cartridge; and
said cartridges having a male-female system for connection at both ends of said cartridges.

21. The container according to claim 20, wherein said cartridges are predominantly made of a plastic material.

22. The container according to claim 20, wherein said cartridges are at least partially made from a same material as said adsorption medium.

23. The container according to claim 20, wherein said cartridges and said adsorption medium are at least partially made from a ceramic.

24. The container according to claim 20, wherein said cartridges each have a cartridge wall that can be pretensioned, said cartridge wall having at least one of a partially circumferential crease formed therein and different wall sections with at least one of different coefficients of elasticity and different heat expansion coefficients.

25. The container according to claim 20, including a pressure-exerting device disposed adjacent to said adsorption medium.

26. The container according to claim 25, wherein said pressure-exerting device is pre-tensed.

27. The container according to claim 25, wherein said pressure-exerting device is selected from the group consisting of a spring and an elastic material.

28. The container according to claim 27, wherein said cartridges each have an interior that is at least partially clad with said elastic material.

29. The container according to claim 27, including an elastic hose, and said cartridges each have an interior that is at least partially fitted with said elastic hose.

30. The container according to claim 20, wherein said container body has a vent for letting the gas out from the container body, said cartridges each have a section sealing off said vent.

31. The container according to claim 30, wherein said section of said cartridges is an elastic section.

32. The container according to claim 20, wherein at least one of said cartridges and said container body has a display for at least one of transmitting and displaying a status of the adsorption medium.

33. The container according claim 32, wherein at least one of said cartridges and said container body has a capacitance measurer for taking a capacitive measurement of said adsorption medium.

34. The container according to claim 20, wherein said second cartridge stacked above said first cartridge has a different adsorption medium than said adsorption medium of said first cartridge.

35. The container according to claim 34, wherein in a direction in which the gas to be dried flows through said cartridges, said adsorption medium in said first cartridge contains a water-resistant adsorption medium.

36. The container according to claim 20, including a cover connected to a corresponding cartridge such that a gas delivery into said corresponding cartridge is ensured and said corresponding cartridge is suspended in said container body.

37. The container according to claim 20, including a seal disposed along only one line of at least two of said cartridges for sealing off said cartridges from said container body.

38. The container according to claim 37, wherein said seal is in a vicinity of an opening of at least one of a gas line and a base line to be connected to said container body.

* * * * *

UNITED STATES PATENT AND TRADEMARK OFFICE
CERTIFICATE OF CORRECTION

PATENT NO.      : 6,139,609
DATED           : October 31, 2000
INVENTOR(S)     : Klaus Eimer et al.

Page 1 of 1

It is certified that error appears in the above-identified patent and that said Letters Patent is hereby corrected as shown below:

<u>Title page,</u>
Item [30], should read as follows:
Oct. 31, 1996   (DE) ............. 196 45 009.8

Signed and Sealed this

Nineteenth Day of February, 2002

*Attest:*

*Attesting Officer*

JAMES E. ROGAN
*Director of the United States Patent and Trademark Office*